(12) United States Patent  
Kondoh

(10) Patent No.: US 6,504,101 B2
(45) Date of Patent: Jan. 7, 2003

(54) CLIP FOR FLAT HARNESS

(75) Inventor: Tatsuya Kondoh, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/793,919

(22) Filed: Feb. 28, 2001

(65) Prior Publication Data

US 2001/0023778 A1 Sep. 27, 2001

(30) Foreign Application Priority Data

Feb. 29, 2000 (JP) ........................................ 2000-054328

(51) Int. Cl.[7] ................................................ H01B 7/08
(52) U.S. Cl. .................. 174/135; 174/70 A; 174/70 C; 174/72 C; 174/71 R; 174/117 F; 174/117 FF; 174/72 R; 174/138 R; 174/138 E
(58) Field of Search ............................ 174/70 A, 70 C, 174/72 C, 71 R, 117 F, 117 FF, 72 R, 138 R, 138 E; 24/458, 487, 16 R, 16 PB, 30.5 R, 30.5 P; 248/71, 74.3

(56) References Cited

U.S. PATENT DOCUMENTS

| 4,457,482 A | * | 7/1984 | Kitagawa ..................... 248/73 |
| 4,650,925 A | * | 3/1987 | Coldren ...................... 174/135 |
| 4,669,688 A | | 6/1987 | Itoh et al. |
| D308,017 S | * | 5/1990 | Fujioka ..................... D13/154 |
| 5,160,812 A | * | 11/1992 | Takahashi et al. .......... 174/135 |
| 5,584,452 A | * | 12/1996 | Koike ....................... 24/16 PB |
| 5,937,745 A | * | 8/1999 | Boe ............................... 100/2 |
| 5,962,814 A | * | 10/1999 | Skipworth et al. .......... 174/135 |

* cited by examiner

Primary Examiner—Dean A. Reichard
Assistant Examiner—Jinhee Lee
(74) Attorney, Agent, or Firm—Greenblum & Bernstein, P.L.C.

(57) ABSTRACT

A clip for a flat harness is provided that includes an upper plate, a stem portion extending from a vicinity of an end in a longitudinal direction of the upper plate, and at least one projecting portion provided on an outer peripheral surface of the stem portion. The clip further includes a lower plate defining a stem portion insertion hole at a position corresponding to the stem portion, a cylindrical portion extending downwardly from the lower plate at a margin of the stem portion insertion hole. The stem portion is insertable into the cylindrical portion. At least one recessed portion is provided in an inner peripheral surface of the cylindrical portion. The at least one recessed portion is engageable with the at least one projecting portion. A wing-shaped engaging portion extends upwardly from an end of the cylindrical portion, and is engageable with the automobile body.

18 Claims, 8 Drawing Sheets

PRIOR ART

PRIOR ART

CLIP FOR FLAT HARNESS

BACKGROUND OF THE INVENTION

1. Field of the Invention

This invention relates to a clip for a flat harness, in particular, a clip that can fix one or more flat harnesses mounted to an automobile body regardless of the number of flat harnesses.

2. Description of Related Art

Conventionally, a flat harness is used as a type of an automobile wire harness. The flat harness is formed by a plurality of conductor strips made of, for example, a conductor foil, and arranged in parallel at intervals, between insulating films. When the flat harness is fixed to an automobile body, generally, as shown in FIG. 6, adhesive 2 is applied to a surface of the flat harness 1 to fix a clip 3 used for engagement with an automobile body. When flat harnesses 1A, 1B, 1C are laminated and fixed to an automobile body, as shown in FIGS. 7(A) and 7(B), the flat harnesses 1A, 1B and 1C are adhesively fixed by using the adhesive 2 one after another, and the clip 3 is fixed on the flat harness 1C, which is the lowest layer (FIG. 7(B)), by using adhesive 2. A wing-shape engaging portion 3a of the clip 3 is inserted into and is retained in a clip hole 6 of an automobile body 5 so as to fix the flat harness to the automobile body 5.

When the clip 3 is fixed by using adhesive 2 as described above, due to the use of the adhesive, there is a problem of permanence. Similarly, since the flat harnesses to be laminated are fixed to each other by using adhesive, there is a problem of permanence. In addition, the laminated flat harnesses are required to be fixed to each other by using adhesive previous to being mounted to an automobile body. Thus, it takes a long time and causes the additional problem of being bulky.

Accordingly, the present invention is provided in view of the above-described problems, and an objective of the present invention is to use a mechanical means to securely fix a flat harness to an automobile body and to securely fix the flat harnesses to each other, instead of the fixation using adhesive. In addition, another objective of the present invention is, when the flat harnesses are laminated, to remove the requirement of the flat harnesses being combined as one piece in advance, and to enable the flat harnesses to be laid one on top of another at the time of mounting to an automobile body.

SUMMARY OF THE INVENTION

To achieve the above and/or other goals, the present invention provides a clip for a flat harness including an upper plate, a first stem portion extending from a vicinity of a first end in a longitudinal direction of the upper plate, and at least one first projecting portion provided on an outer peripheral surface of the first stem portion. A lower plate is provided and defines a first stem portion insertion hole at a position facing the first stem portion. A first cylindrical portion extends downwardly from the lower plate at a margin of the first stem portion insertion hole. At least one first recessed portion is provided in an inner peripheral surface of the first cylindrical portion, and a first wing-shaped engaging portion extends upwardly from an end of the first cylindrical portion. The first stem portion is insertable into the first cylindrical portion. The first cylindrical portion is insertable into a clip hole provided in an automobile body. The at least one first recessed portion is engageable with the at least one first projecting portion when the first stem portion is inserted into the first cylindrical portion, so that at least one flat harness is held between the upper plate and the lower plate. The first wing-shaped engaging portion is configured to engage with the automobile body.

As described above, when the flat harness is held between the upper plate and the lower plate, the stem portion on the upper plate is inserted into the cylindrical portion on the lower plate, and the projecting portion on the stem portion engages with the recessed portion on the lower plate, the position of the recessed portion that engages with the projecting portion, can be changed according to the thickness of the flat harness. Accordingly, regardless of the number of the flat harnesses, the flat harnesses can be securely held between the upper plate and the lower plate according to the thickness of the flat harnesses.

Preferably, the clip, includes a hinge that connects the upper plate and the lower plate at a second end in the longitudinal direction to form a single unit. The second end is opposite to the first end, where the stem portion is provided.

Alternatively, the upper plate and the lower plate are provided as separate components, and the clip further includes a second stem portion extending from a vicinity of a second end in a longitudinal direction of the upper plate and the clip includes at least one second projecting portion provided on an outer peripheral surface of the second stem portion. The second end is opposite to the first end, where the first stem portion is provided. The lower plate defines a second stem portion insertion hole at a position facing the second stem portion. The clip further includes a second cylindrical portion extending downwardly from the lower plate at a margin of the second stem portion insertion hole. The second stem portion is insertable into the second cylindrical portion, and the second cylindrical portion is insertable into a clip hole provided in the automobile body. Further, at least one second recessed portion is provided in an inner peripheral surface of the second cylindrical portion. The at least one second recessed portion is engageable with the at least one second projecting portion when the second stem portion is inserted into the second cylindrical portion, so that the at least one flat harness is held between the upper plate and the lower plate. A second wing-shaped engaging portion extends upwardly from an end of the second cylindrical portion, the wing-shaped engaging portion is configured to engage with the automobile body.

Furthermore, it is preferable that the cylindrical portion is separated into halves along an axial direction of the cylindrical portion. When the cylindrical portion is separated into halves, the insertion pressure of the stem portion can be reduced.

According to another aspect of the present invention, a clip for a flat harness is provided including an upper plate, a first stem portion extending from a vicinity of a first end in a longitudinal direction of the upper plate, a lower plate including a first stem portion insertion hole at a position facing the first stem portion, a first cylindrical portion extending downwardly from the lower plate at a margin of the first stem portion insertion hole. The first stem portion is insertable into the first cylindrical portion, and the first cylindrical portion is insertable into a clip hole provided in an automobile body. The clip further includes a first wing-shaped engaging portion extending upwardly from an end of the first cylindrical portion. The first wing-shaped engaging portion is configured to engage with the automobile body. A first retainer is provided between an outer peripheral surface of the first stem portion and an inner peripheral surface of the first cylindrical portion to retain the first stem portion in the first cylindrical portion after the first stem portion is inserted into the first cylindrical portion, so that at least one flat harness is held between the upper plate and the lower plate.

The retainer can include at least one projecting portion provided on the outer peripheral surface of the stem portion and at least one recessed portion provided in the inner peripheral surface of the cylindrical portion. Alternatively, the retainer can include at least one recessed portion provided in the outer peripheral surface of the stem portion and at least one projecting portion provided on the inner peripheral surface of the cylindrical portion. The projecting portion and the recessed portion engage with each other so that the stem portion is retained in the cylindrical portion.

According to another aspect of the present invention, a method is provide for mounting at least one flat harnesses to an automobile body using the above-described clip. First, at least one flat harness is provided between the upper plate and the lower plate of the clip. The at least one flat harness can be placed in a condition that the longitudinal direction of the clip is perpendicular to the longitudinal direction of the flat harness. The first stem portion is inserted into the first cylindrical portion through the first stem portion insertion hole. The at least one first projecting portion is made to engage with the at least one first recessed portion. Finally, the first cylindrical portion, with the first wing-shaped engaging portion compressed, is inserted into a clip hole provided in the automobile body so that the first wing-shaped engaging portion engages with the automobile body.

Alternatively the method for mounting at least one flat harnesses to an automobile body using the clip can include inserting the first cylindrical portion, with the first wing-shaped engaging portion compressed, into a clip hole provided in the automobile body so that the first wing-shaped engaging portion engages with the automobile body; providing the at least one flat harnesses on the lower, plate; covering the upper plate on the at least one flat harness provided on the lower plate so that the at least one flat harness is held between the upper plate and the lower plate; and inserting the first stem portion into the first cylindrical portion through the first stem portion insertion hole.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following with reference to the figures. FIGS. 1–3(C) illustrate a first embodiment. A clip 10 is provided with an upper plate 11 and a lower plate 12, which are, for example, rectangular-shaped and made of a suitable material, for example a resilient material, such as a resin. An end of the upper plate 11 and an end of the lower plate 12 in the longitudinal direction are connected by using a suitable hinge 13, such as the unitary hinge shown, so as to be opened and closed.

Figure 1:
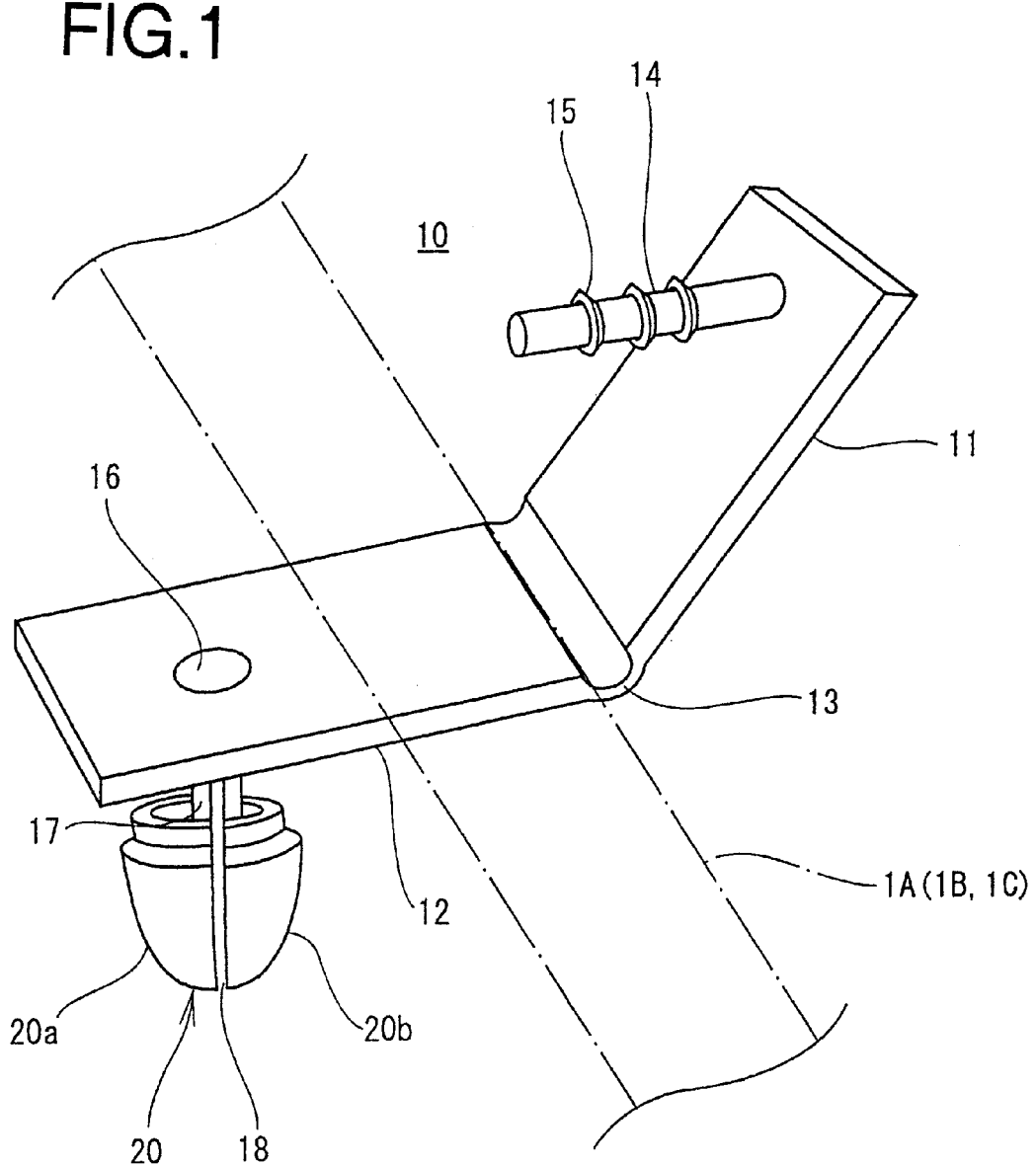
FIG. 1 is a perspective view illustrating a clip according to a first embodiment of the present invention.
Figure 2:
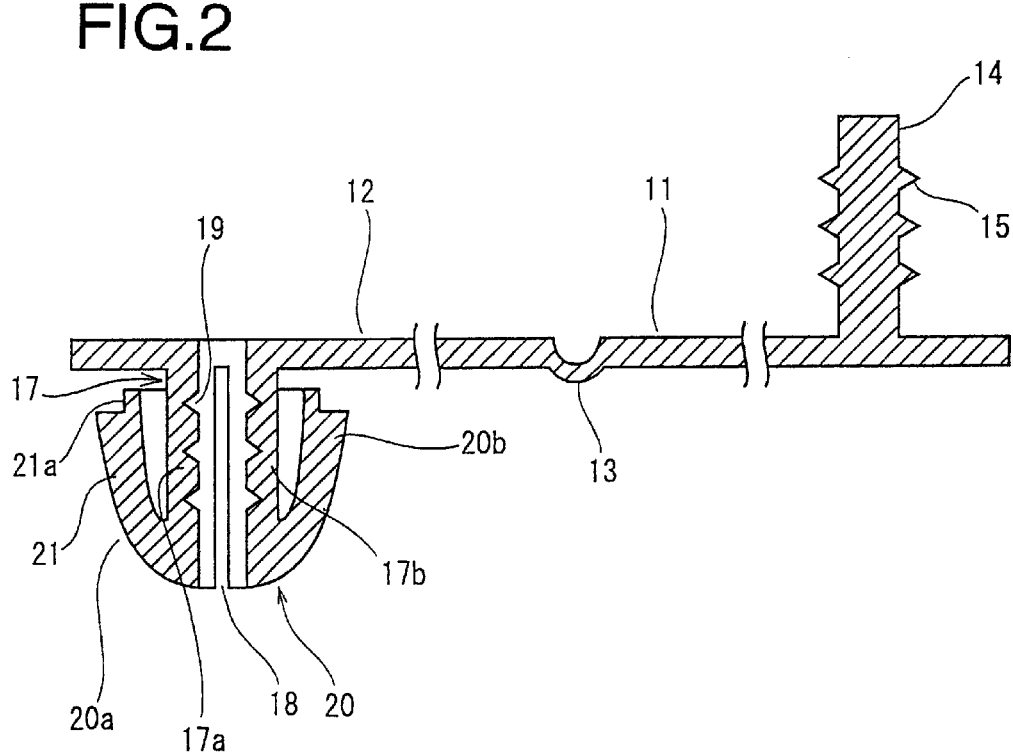
FIG. 2 is a cross-sectional view illustrating the clip of FIG. 1.

A stem portion 14 projects from the upper plate 11 adjacent to another end in the longitudinal direction. Projecting portions 15 are provided on an outer peripheral surface of the stem portion 14 and spaced in the axial direction of the stem portion 14. The projecting portions 15 have a circular shape and surround the outer peripheral surface of the stem portion. A cross-section of the projecting portion has an outwardly extending, generally V-shape, as shown in FIG. 2. In the present embodiment, three projecting portions are provided with regular intervals, but any suitable number having any suitable spacing may be provided.

Figure 8:
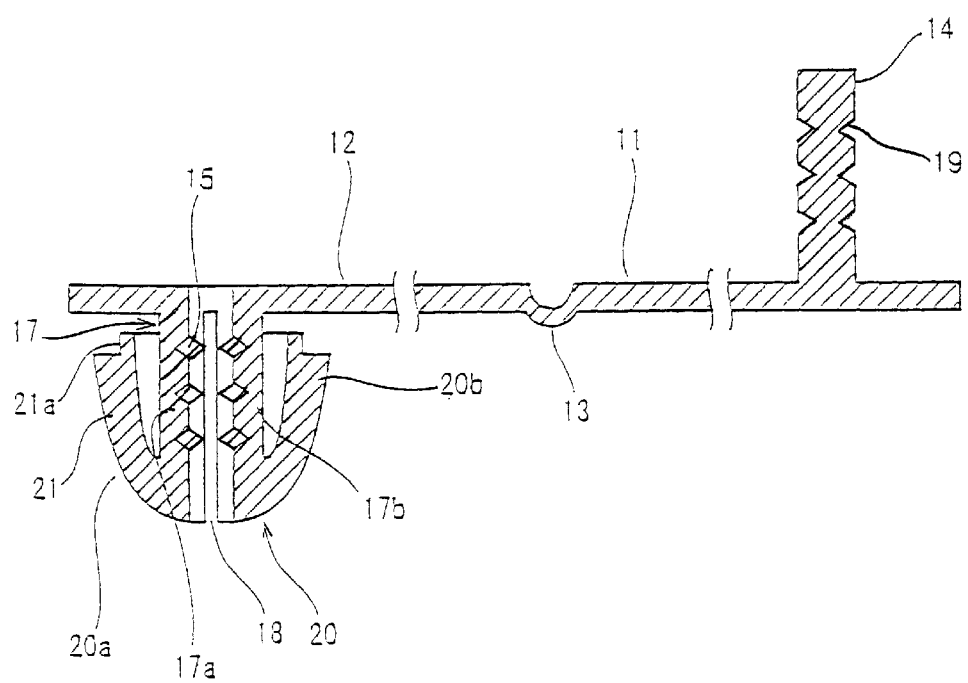
FIG. 8 is a cross-sectional view illustrating a clip according to a third embodiment of the present invention.

On the other hand, a stem portion insertion hole 16 is provided in the lower plate 12 at the position corresponding to that of the stem portion 14. A single generally cylindrical portion 17 projects downwardly from a margin of the stem portion insertion hole 16. The stem portion 13 is insertable into the interior of the cylindrical portion 17 through the stem portion insertion hole 16. The cylindrical portion 17 has slits 18, which oppose to one another along the axial direction of the cylindrical portion 17, and the slits 18 separate the cylindrical portion 17 into two portions to form semi-cylindrical portions 17a and 17b. Recessed portions 19 (FIG. 2) are provided in the inner peripheral surface of the cylindrical portion 17 spaced in the axial direction of the cylindrical portion 17. The recessed portions 19 are engageable with the corresponding projecting portions 15. Further, wing-shaped engaging portions 20 (20a and 20b) extend upwardly from the end of each semi-cylindrical portion 17a, 17b. An engaging step portion 21 is provided at an end of each wing portion 21. In an alternative embodiment of the present invention shown in FIG. 8, projecting portions 15 are provided in the inner peripheral surface of the cylindrical portion 17 space in the axial direction of the cylindrical portion. Recessed portions 19 are provided on an outer peripheral surface of the stem portion 14 and spaced in the axial direction of the stem portion 14.

Figure 3A:
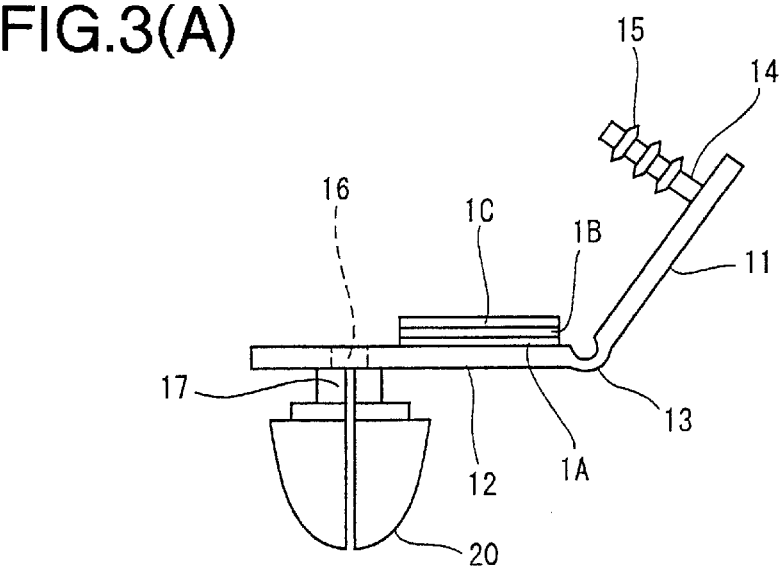
FIG. 3(A) is a view illustrating a first step in an assembly process and a mounting process to an automobile body according to the first embodiment of the present invention.
Figure 3B:
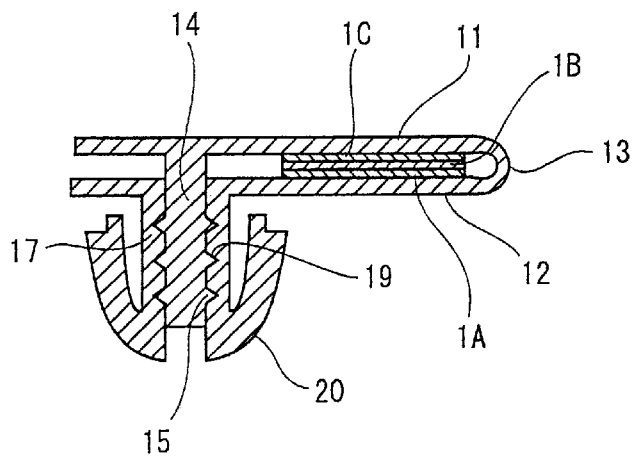
FIG. 3B is a view illustrating a second step in an assembly process and a mounting process to an automobile body according to the first embodiment of the present invention.

The operation to mount plural flat harnesses (three in this embodiment) to the automobile body 5 by using the clip 10 is performed as follows. First, as shown in FIG. 3(A), the upper plate 11 and the lower plate 12 of the clip 10 are opened, and then the superposed flat harnesses 1A, 1B and 1C are positioned on one of the upper plate 11 and the lower plate 12. In this condition, the longitudinal direction of the upper plate 11 and the lower plate 12 is orthogonally positioned to the flat harnesses. Adjacent to the end where the clip 10 does not interfere with the flat harnesses 1A, 1B and 1C, the stem portion 14 on the upper plate 11 is inserted into the cylindrical portion 17 provided on the lower plate 12. In this condition, the upper plate 11 contacts the flat harness 1C in the top layer, and the three flat harnesses are held between the upper plate 11 and the lower plate 12, as shown in FIG. 3(B). The stem portion 15 is inserted into the cylindrical portion 17 through the stem portion insertion hole 16 of the lower plate 12, and the projecting portions 15 on the stem portions 14 engage with the recessed portions 19 provided in the cylindrical portion 17, so as to fix the flat harnesses to the clip. Since the width between the upper plate 11 and the lower plate 12 can be adjusted, the flat harnesses can be held between the upper plate 11 and the lower plate 12, regardless of the number of flat harnesses.

Figure 3C:
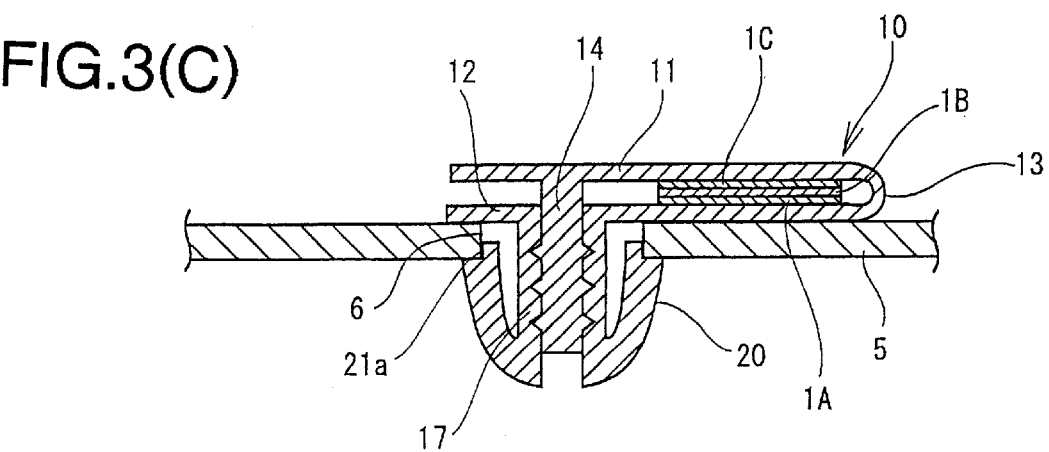
FIG. 3C is a view illustrating a third step in an assembly process and a mounting process to an automobile body according to the first embodiment of the present invention.

Next, as shown in FIG. 3(C), the cylindrical portion 17, from which the wing-shaped engaging portion 20 extends and that is provided on the lower plate 12, is inserted into the clip hole 6 of the automobile body 5 by compressing the wing-shaped engaging portions 20. After the insertion, the wing-shaped engaging portions 20 expand and thus the engaging step portion 21a also expands. Thus, the engaging step portion 21a engages with the peripheral edge of the clip hole so that the clip 10 is fixed to the automobile body 5.

Alternatively, after the lower plate 12 of the clip 10 is fixed to the automobile body 5, the flat harnesses are superposed on the lower plate 12, the upper plate 11 is closed, and the stem portion 14 is inserted into the cylindrical portion 17. In other words, after the clip 10 is fixed to the automobile body 5, the flat harnesses can be held by the clip 10. In the above-described embodiment, the three flat harnesses are superposed and fixed to the automobile body. However, needless to say, only one flat harness may be used, instead.

Figure 4:
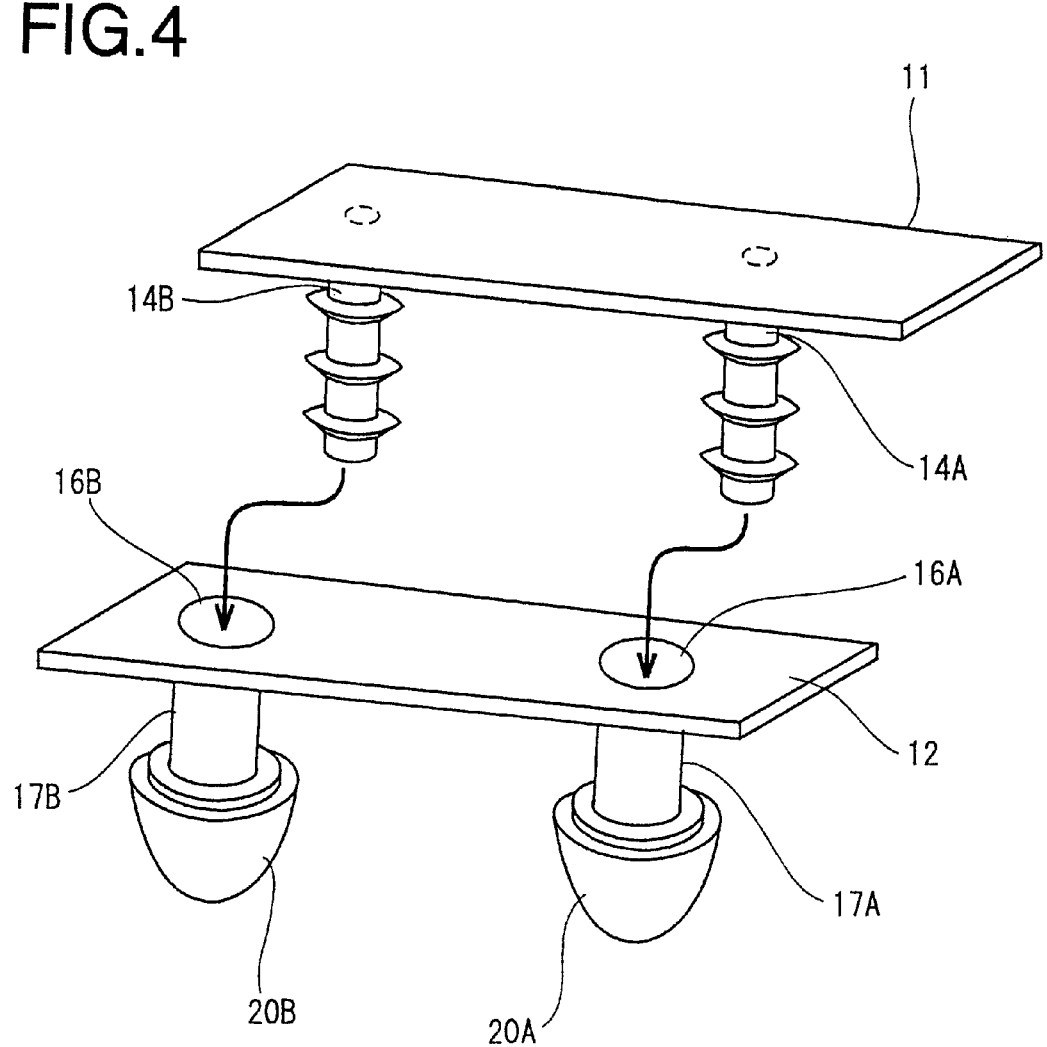
FIG. 4 is a perspective view illustrating a clip according to a second embodiment of the present invention.
Figure 5:
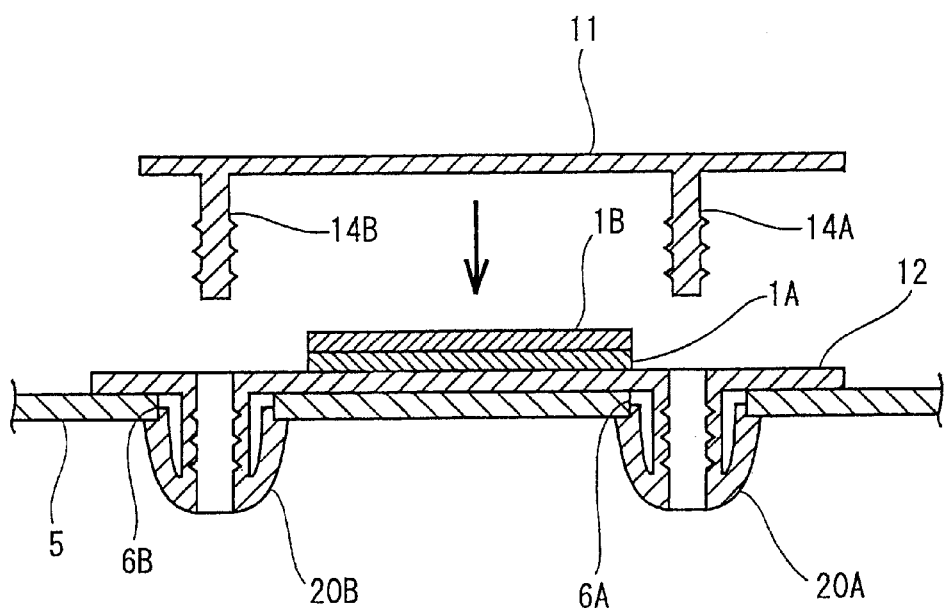
FIG. 5 is a view illustrating an assembling process and a mounting process to an automobile body according to the second embodiment of the present invention.
Figure 6:
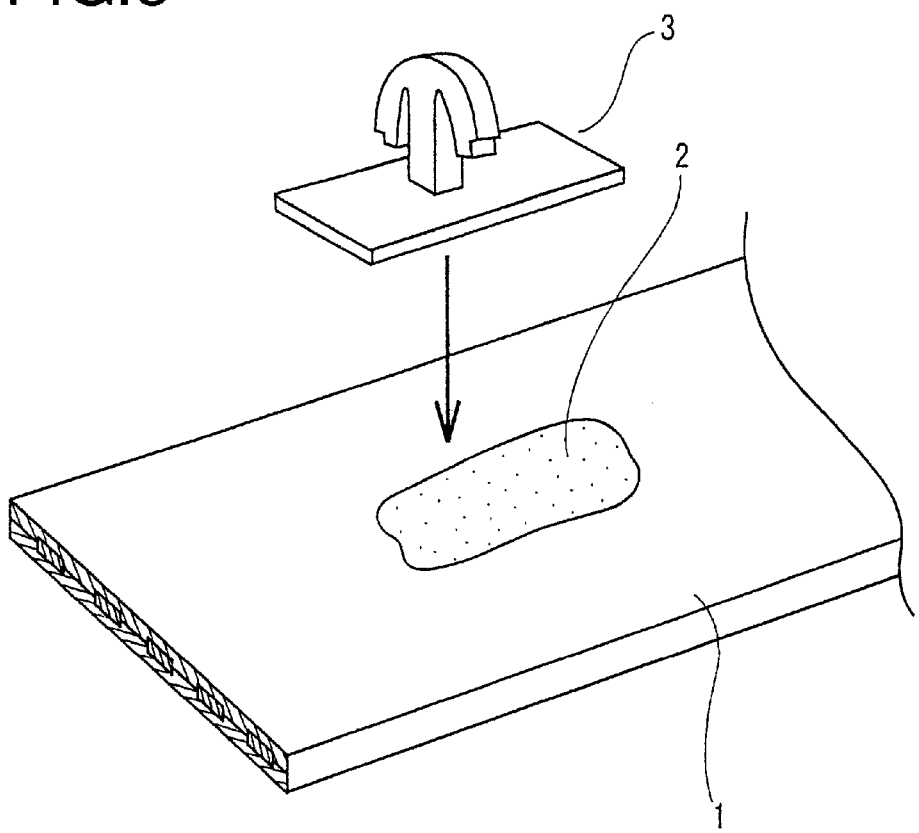
FIG. 6 is a perspective view illustrating a conventional method to fix a flat harness with a clip.
Figure 7A:
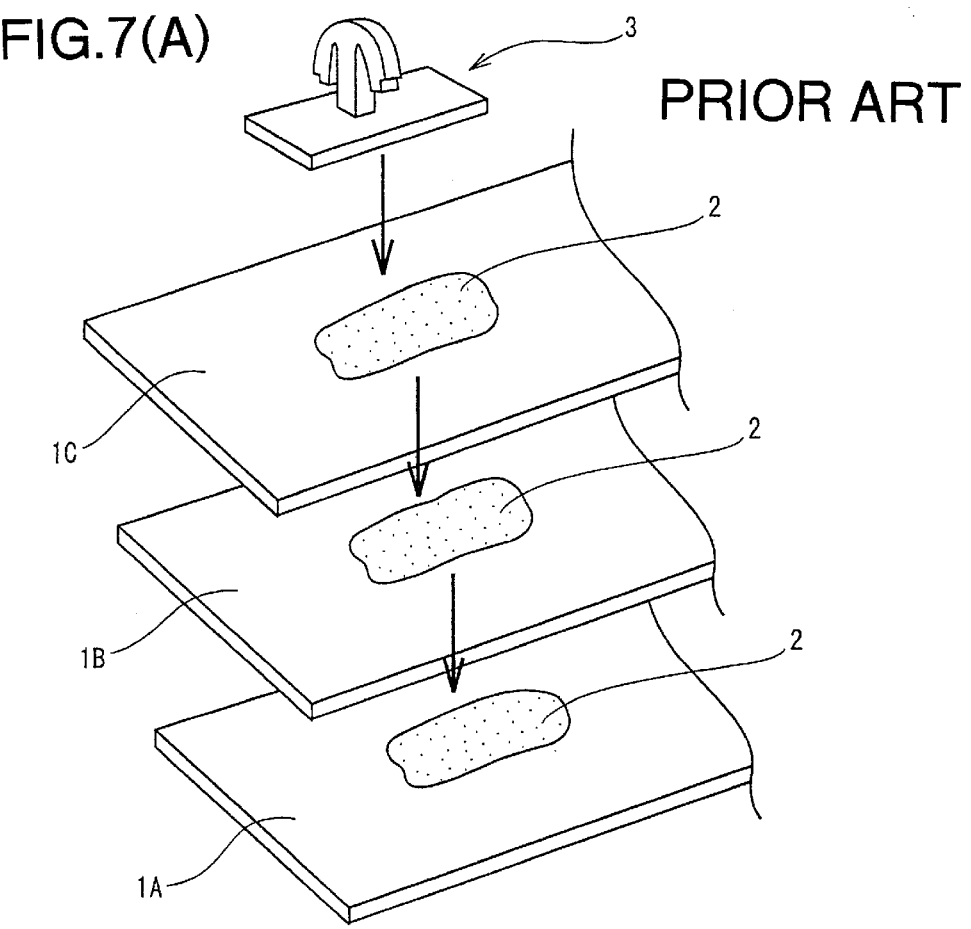
FIG. 7(A) is a perspective view illustrating a conventional method to fix a clip to the flat harness and to fix the flat harnesses to each other.
Figure 7B:
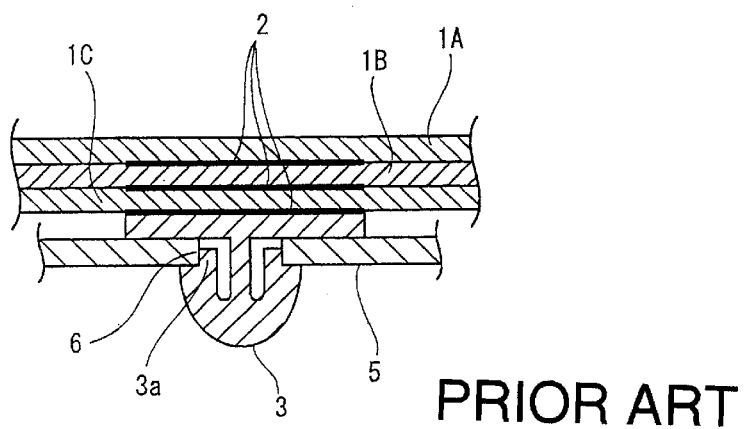
FIG. 7(B) is a cross-sectional view illustrating the conventional method to fix the clip to the flat harness, to fix the flat harness to each other and mounting thereof to an automobile body.

FIG. 4 illustrates a second embodiment of the present invention. In this embodiment, the upper plate 11 and the lower plate 12 are provided separately. Stem portions 14A and 14B are provided at the vicinities of opposite ends in the longitudinal direction of the upper plate 11. Stem portion insertion holes 16A and 16B are provided at the vicinity of the opposite ends of the lower plate 12. Cylindrical portions 17A and 17B extend from the lower side of the margins of the stem portion insertion holes 16A and 16B, respectively. In the second embodiment, each of the cylindrical portions 17A and 17B has a cylindrical shape without a slit. Since wing-shaped engaging portions 20A and 20B are provided at the tips of both cylindrical portions 17A and 17B, respectively, clip holes 6A and 6B are provided in the automobile body 5. (FIG. 5). Note that, although, in the second embodiment, the cylindrical portions 17A and 17B do not have a slit and are not separated into halves like the first embodiment, since the cylindrical portions are made from a resilient material, such as a resin, the projecting portions 14A or 14B can be inserted into the cylindrical portion 17A or 17B so as to slidably contact the inner peripheral surface of the cylindrical portion 17A or 17B, to engage with the recessed portion.

In the second embodiment, as shown in FIG. 5, when the clip is fixed to the automobile body 5, after the lower plate 12 is fixed to the automobile body 5, the flat harnesses 1A and 1B are superposed on the upper surface of the lower plate 12, and then, the upper plate 11 is mounted to and engages with the lower plate 12 to hold the flat harnesses between the upper plate 11 and the lower plate 12. Similar to the first embodiment, it is possible that, after the flat harnesses are held between the upper plate 11 and the lower plate 12 to form a clip assembly, the clip assembly is fixed to the automobile body 5.

As clearly described above, according to the present invention, since the flat harnesses are held between the upper plate and the lower plate of the clip, when the flat harnesses are superposed, the flat harnesses are not required to be fixed by using adhesive, and there is no limit to the number of the flat harnesses. Furthermore, one or more flat harnesses may be fixed to the automobile body as a single unit.

Further, the flat harnesses to be superposed are not required to form a single unit previous to mounting operation. Thus, in an automobile assembly line, the flat harnesses can be superposed and fixed to an automobile body by using the clip.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-54328, filed on Feb. 29, 2000, which is herein expressly incorporated by reference in its entirety.

What is claimed is:

1. A clip for a flat harness comprising:
   an upper plate;
   a first stem portion extending from a vicinity of a first end in a longitudinal direction of the upper plate;
   a plurality of first projecting portions provided on an outer peripheral surface of the first stem portion and spaced at predetermined intervals in an axial direction of the first stem portion;
   a lower plate defining a first stem portion insertion hole at a position corresponding to the first stem portion;
   a first cylindrical portion extending downwardly from the lower plate at a margin of the first stem portion insertion hole, the first stem portion being insertable into the first cylindrical portion, and the first cylindrical portion being insertable into a clip hole provided in an automobile body;
   a plurality of first recessed portions provided in an inner peripheral surface of the first cylindrical portion and spaced at predetermined intervals in an axial direction of the first cylindrical portion, at least one of the first recessed portions being engageable with at least one of the first projecting portions when the first stem portion is inserted into the first cylindrical portion, so that a space between the upper plate and the lower plate can be adjusted, and so that one or more flat harnesses are retainable between the upper plate and the lower plate; and a first wing-shaped engaging portion extending upwardly from an end of the first cylindrical portion, the first wing-shaped engaging portion being configured to engage with the automobile body.

2. The clip for the flat harness according to claim 1, further comprising: a hinge that connects the upper plate and the lower plate at a second end in the longitudinal direction, to form a single unit, the second end being opposite to the first end.

3. The clip for the flat harness according to claim 1, further comprising:
   a second stem portion extending from a vicinity of a second end in a longitudinal direction of the upper plate, the second end being opposite to the first end;
   at least one second projecting portion provided on an outer peripheral surface of the second stem portion;
   the lower plate defining a second stem portion insertion hole at a position corresponding to the second stem portion
   a second cylindrical portion extending downwardly from the lower plate at a margin of the second stem portion insertion hole, the second stem portion being insertable into the second cylindrical portion, the second cylindrical portion being insertable into a clip hole provided in the automobile body;
   at least one second recessed portion provided in an inner peripheral surface of the second cylindrical portion, the at least one second recessed portion being engageable with the at least one second projecting portion when the second stem portion is inserted into the second cylindrical portion, so that the one or more flat harnesses are retainable between the upper plate and the lower plate; and
   a second wing-shaped engaging portion extending upwardly from an end of the second cylindrical portion, the wing-shaped engaging portion being configured to engage with the automobile body.

4. The clip for the flat harness according to claim 1, wherein the first cylindrical portion has mutually opposed slits that separate the first cylindrical portion into halves along the axial direction of the cylindrical portion.

5. A method for mounting at least one flat harness to an automobile body using the clip according to claim 1, the method comprising:
   positioning the at least one flat harness between the upper plate and the lower plate;
   inserting the first stem portion into the first cylindrical portion through the first stem portion insertion hole;
   engaging the at least one first projecting portion with the at least on e first recessed portion;
   compressing the first cylindrical portion with the first wing-shaped engaging portion and inserting the compressed first cylindrical portion into a clip hole provided in the automobile body so that the first wing-shaped engaging portion engages with the automobile body.

6. A method for mounting at least one flat harness to an automobile body using the clip according to claim 1, the method comprising:
   compressing the first cylindrical portion with the first wing-shaped engaging portion and inserting the compressed first cylindrical portion into a clip hole provided in the automobile body so that the first wing-shaped engaging portion engages with the automobile body;
   positioning the at least one flat harness on the lower plate;
   covering the upper plate on the at least one flat harness provided on the lower plate so that the at least one flat harness is retained between the upper plate and the lower plate;
   inserting the first stem portion into the first cylindrical portion through the first stem portion insertion hole.

7. A clip for a flat harness comprising:
   an upper plate;
   a first stem portion extending from a vicinity of a first end in a longitudinal direction of the upper plate;
   a lower plate including a first stem portion insertion hole at a position corresponding to the first stem portion;
   a first cylindrical portion extending downwardly from the lower plate at a margin of the first stem portion insertion hole, the first stem portion being insertable into the first cylindrical portion, the first cylindrical portion being insertable into a clip hole provided in an automobile body;
   a first wing-shaped engaging portion extending upwardly from an end of the first cylindrical portion, the first wing-shaped engaging portion being configured to engage with the automobile body; and
   a first retainer that is provided between an outer peripheral surface of the first stem portion and an inner peripheral surface of the first cylindrical portion to retain the first stem portion in the first cylindrical portion at a desired position along an axial direction of the first cylindrical portion so that the space between the upper plate and the lower plate is adjusted when the first stem portion is inserted into the first cylindrical portion, so that one or more flat harnesses are retainable between the upper plate and the lower plate.

8. The clip for a flat harness according to claim 7, wherein the retainer comprises:
   at least one first projecting portion provided on the outer peripheral surface of The first stem portion; and
   at least one first recessed portion provided in the inner peripheral surface of the first cylindrical portion, the at least one first recessed portion being engageable with the at least one first projecting portion when the first stem portion is inserted into the first cylindrical portion.

9. The clip for a flat harness according to claim 8, wherein the at least one first projecting portion comprises a plurality of first projecting portions, and
   the at least one first recessed portion comprises a plurality of first recessed portions.

10. The clip for a flat harness according to claim 7, wherein the retainer comprises:
   at least one first recessed portion provided in an outer peripheral surface of the first stem portion; and
   at least one first projecting portion provided in an inner peripheral surface of the first cylindrical portion, the at least one first projecting portion being engageable with the at least one first recessed portion when the first stem portion is inserted into the first cylindrical portion.

11. The clip for a flat harness according to claim 10, wherein the at least one first recessed portion comprises a plurality of first recessed portions, and
   the at least one first projecting portion comprises a plurality of first projecting portions.

12. The clip for the flat harness according to claim 7, further comprising:
a hinge that connects the upper plate and the lower plate at a second end in the longitudinal direction, to form a single unit, the second end being opposite to the first end.

13. The clip for the flat harness according to claim 7, further comprising: a second stem portion extending from a vicinity of a second end in the longitudinal direction of the upper plate, the second end being opposite to the first end;
the lower plate defining a second stem portion insertion hole at a position corresponding to the second stem portion;
a second cylindrical portion extending downwardly from the lower plate at a margin of the second stem portion insertion hole, the second stem portion being insertable into the second cylindrical portion, the second cylindrical portion being insertable into a clip hole provided in the automobile body;
a second wing-shaped engaging portion extending upwardly from an end of the second cylindrical portion, the second wing-shaped engaging portion being configured to engage with the automobile body; and
a second retainer that is provided between an outer peripheral surface of the second stem portion and an inner peripheral surface of the second cylindrical portion to retain the second stem portion in the second cylindrical portion after the second stem portion is inserted into the second cylindrical portion, so that the one or more flat harnesses are retainable between the upper plate and the lower plate.

14. The clip for a flat harness according to claim 13, wherein the retainer comprises:
at least one second projecting portion provided on the outer peripheral surface of the second stem portion; and
at least one second recessed portion provided in the inner peripheral surface of the second cylindrical portion, the at least one second recessed portion being engageable with the at least one second projecting portion when the second stem portion is inserted into the second cylindrical portion.

15. The clip for a flat harness according to claim 14, wherein the at least one second projecting portion comprises a plurality of second projecting portions, and
the at least one second recessed portion comprises a plurality of second recessed portions.

16. The clip for a flat harness according to claim 13, wherein the retainer comprises:
at least one second recessed portion provided in an outer peripheral surface of the second stem portion; and
at least one second projecting portion provided in an inner peripheral surface of the second cylindrical portion, the at least one second projecting portion being engageable with the at least one second recessed portion when the second stem portion is inserted into the second cylindrical portion.

17. The clip for a flat harness according to claim 16, wherein the at least one second recessed portion comprises a plurality of second recessed portions, and
the at least one second projecting portion comprises a plurality of second projecting portions.

18. A clip for a flat harness comprising:
an upper plate;
a stem portion extending downwardly from the upper plate;
at least one first projecting portion provided on an outer peripheral surface of the first stem portion;
a lower plate defining a stem portion insertion hole at a position corresponding to the stem portion;
a cylindrical portion extending downwardly from the lower plate at a margin of the stem portion insertion hole, the cylindrical portion having mutually opposed slits that separate the cylindrical portion into halves along an axial direction of the cylindrical portion, the stem portion being insertable into the cylindrical portion, and the cylindrical Portion being insertable into a clip hole provided in an automobile body;
a plurality of recessed portions provided in an inner peripheral surface of the cylindrical portion and spaced at predetermined intervals in the axial direction of the cylindrical portion, the at least one projecting portion being configured to retain at least one of the recessed portions at a desired position along the axial direction of the cylindrical portion when the stem portion is inserted into the cylindrical portion, so that a space between the upper plate and the lower plate can be adjusted, and so that one or more flat harnesses can be retained between the upper plate and the lower plate; and
a first wing-shaped engaging portion extending upwardly from an end of the cylindrical portion, the wing-shaped engaging portion being configured to engage with the automobile body.

* * * * *

UNITED STATES PATENT AND TRADEMARK OFFICE
CERTIFICATE OF CORRECTION

PATENT NO.    : 6,504,101 B2
DATED         : January 7, 2003
INVENTOR(S)   : T. Ouchi et al.

It is certified that error appears in the above-identified patent and that said Letters Patent is hereby corrected as shown below:

Column 7,
Line 56, "on e" should be -- one --.

Column 8,
Line 41, "The" should be -- the --.

Column 10,
Line 28, "Portion" should be -- portion --.

Signed and Sealed this

Nineteenth Day of August, 2003

JAMES E. ROGAN
*Director of the United States Patent and Trademark Office*